No. 874,239.
PATENTED DEC. 17, 1907.
G. W. RATLIFF.
DRENCHING BIT.
APPLICATION FILED JUNE 27, 1907.
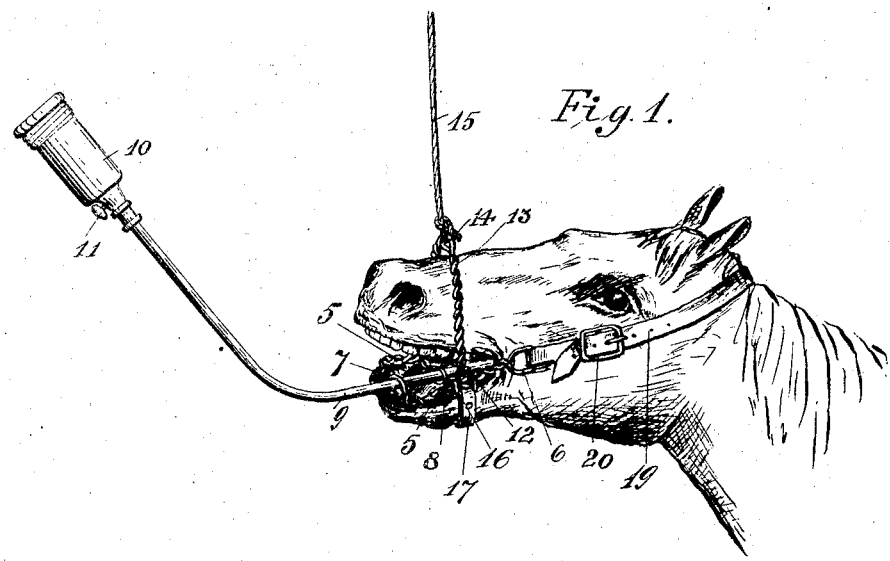
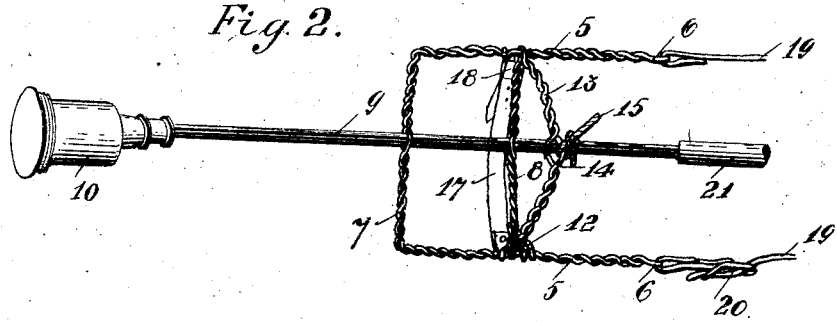
WITNESSES:
George W. Ratliff
INVENTOR
BY
Attorneys

UNITED STATES PATENT OFFICE.

GEORGE W. RATLIFF, OF KYANA, INDIANA, ASSIGNOR OF ONE-HALF TO JOSEPH W. HAAS, OF SCHNELLVILLE, INDIANA.

DRENCHING-BIT.

No. 874,239.　　　Specification of Letters Patent.　　　Patented Dec. 17, 1907.

Application filed June 27, 1907. Serial No. 381,037.

*To all whom it may concern:*

Be it known that I, GEORGE W. RATLIFF, a citizen of the United States, residing at Kyana, in the county of Dubois and State of Indiana, have invented certain new and useful Improvements in Drenching-Bits, of which the following is a specification.

This invention is a drenching-bit, and has for its object a device of this kind which can be readily applied to the animal, and also one which is simple in construction and operation.

In the accompanying drawing, Figure 1 is a side elevation showing the application of the invention. Fig. 2 is a plan view of the device removed.

Referring specifically to the drawing, 5 denotes a pair of spaced bars on one end of which are loops 6. The opposite end of the bars are connected by a cross-bar 7, and extending between and connected to the bars 5 is a bit-bar 8. At or about the middle of the bars 7 and 8 are openings in which a tube 9 is mounted. Outside the bar 7 the tube connects with a reservoir 10 which contains the medicine to be administered. A valve 11 is provided for shutting off the supply.

On the bars 5, adjacent the bit-bar 8, are upstanding loops 12 to which a bail 13 is attached having an eye 14 for attachment of a cord 15 by means of which the animal's head will be elevated. On the bars 5 adjacent the bit-bar are also depending loops 16 to which a chin-strap 17 having a buckle 18 is connected. A head-strap 19 having a buckle 20 is connected to the loops 6.

In use, the bit-bar with the tube is placed in the animal's mouth, the bars 5 being on the outside, and the bail 13 extending loosely over the nose. The strap 19 is passed over the head and secured by its buckle, and the strap 17 is passed under the chin and also made fast by its buckle. The cord 15 will be passed through a ring or pulley overhead. The animal's head will be elevated by pulling on the cord and it is held up by fastening the cord. The valve 11 is now opened whereupon the contents of the reservoir flow through the tube 9 into the animal's mouth. After the required quantity has been administered, the valve is closed and the device is removed from the animal. To prevent injury to the mouth, the tube 9 is fitted with a rubber tip 21.

By the device herein described medicines can be safely and easily administered without waste. In the drawings the bit and its frame are shown constructed of twisted wire but any other suitable material may be employed in the manufacture of the device.

I claim:—

1. A drenching-bit comprising side-bars having attaching means and connected at one end by a cross-bar, a bit-bar extending between and connected to the side-bars, a reservoir, a tube carried by the cross-bar and the bit-bar and connected to the reservoir, loops on the side-bars adjacent to the bit-bar, and a bail connected to said loops.

2. A drenching-bit comprising side-bars connected at one end by a cross-bar and having loops at the opposite end, a strap connected to the loops, a bit-bar extending between and connected to the side-bars, top and bottom loops on the side-bars adjacent the bit-bar, a bail connected to the top loops, a strap connected to the bottom loops, a reservoir, and a tube carried by the bit-bar and the cross-bar and connected to the reservoir.

In testimony whereof I affix my signature, in presence of two witnesses.

GEORGE W. RATLIFF.

Witnesses:
C. M. DUGAN,
ED. WORMAN.